(12) United States Patent
Cirillo et al.

(10) Patent No.: US 12,475,506 B1
(45) Date of Patent: Nov. 18, 2025

(54) METHOD AND NON-TRANSITORY COMPUTER-READABLE MEDIUM FOR INTEGRATING INTERACTIVE DATA UNITS IN A USER EXPERIENCE

(71) Applicant: Ibotta, Inc., Denver, CO (US)

(72) Inventors: Louis Cirillo, Denver, CO (US); Bryan Leach, Denver, CO (US)

(73) Assignee: Ibotta, Inc., Denver, CO (US)

( * ) Notice: Subject to any disclaimer, the term of this patent is extended or adjusted under 35 U.S.C. 154(b) by 399 days.

(21) Appl. No.: 17/677,818

(22) Filed: Feb. 22, 2022

Related U.S. Application Data

(60) Provisional application No. 63/154,535, filed on Feb. 26, 2021.

(51) Int. Cl.
*G06Q 30/0601* (2023.01)
(52) U.S. Cl.
CPC .................. *G06Q 30/0641* (2013.01)
(58) Field of Classification Search
CPC .. G06Q 30/0641–0643; G06Q 30/0207–0239; G06Q 30/0222; G06Q 30/0603; G06Q 30/0623–0629; G06Q 30/0633–0635; G06Q 30/0631; G06Q 30/0611; G06Q 30/0253; G06Q 30/0601–0643; G06Q 30/0627–0629
See application file for complete search history.

(56) References Cited

U.S. PATENT DOCUMENTS

| | | | |
|---|---|---|---|
| 8,341,529 B1 * | 12/2012 | Li | G06F 16/95 |
| | | | 715/741 |
| 10,049,397 B1 * | 8/2018 | Patankar | G06Q 30/0631 |
| 10,942,913 B1 * | 3/2021 | Khoyilar | G06F 9/542 |
| 2012/0203674 A1 * | 8/2012 | Balin | G06Q 30/00 |
| | | | 705/27.1 |

(Continued)

OTHER PUBLICATIONS

Yao, J., et al., "A Privacy-Preserving System for Targeted Coupon Service," in IEEE Access, vol. 7, pp. 120817-120830, 2019, doi: 10.1109/ACCESS.2019.2937669. (Year: 2019).*

*Primary Examiner* — Kelly S. Campen
*Assistant Examiner* — Katherine A Barlow
(74) *Attorney, Agent, or Firm* — Wilson Sonsini Goodrich & Rosati

(57) ABSTRACT

The computer networks provided herein may facilitate the delivery of interactive data units to client nodes. In some instance, the computer networks may facilitate the delivery of appearance alterations of item description, based on interactive data units. Provided here is a computer-implemented method for providing real-time graphically distinct items in a user experience, comprising: (a) retrieving, by one or more computer processors, item data associated with an item of a plurality of items from a web page, the item data comprising an item description; (b) identifying, by the one or more computer processors, the item from the plurality of items as matching with one or more of a plurality of interactive data units by using one or more matching algorithms; (c) altering an appearance of the item description (Continued)

associated with the item, to generate a modified item description; and (d) displaying the modified item description in the web page to graphically distinguish the item from the plurality of items as matched with the one or more of the plurality of interactive data unit.

16 Claims, 13 Drawing Sheets

(56) References Cited

U.S. PATENT DOCUMENTS

| | | | |
|---|---|---|---|
| 2012/0259833 A1* | 10/2012 | Paduroiu | G06Q 30/0206 |
| | | | 707/E17.108 |
| 2013/0117106 A1* | 5/2013 | Glassman | G06Q 30/0633 |
| | | | 235/375 |
| 2016/0104189 A1* | 4/2016 | Marcus | G06Q 30/0225 |
| | | | 705/14.34 |
| 2018/0330427 A1* | 11/2018 | Hussain | G06Q 30/0643 |
| 2020/0051114 A1* | 2/2020 | Wang | G06Q 30/0225 |
| 2020/0380551 A1* | 12/2020 | White | G06Q 30/00 |
| 2021/0056580 A1* | 2/2021 | Walker | G06Q 30/0222 |
| 2021/0090117 A1* | 3/2021 | Gauss | G06Q 30/0246 |

* cited by examiner

METHOD AND NON-TRANSITORY COMPUTER-READABLE MEDIUM FOR INTEGRATING INTERACTIVE DATA UNITS IN A USER EXPERIENCE

CROSS-REFERENCE

This application claims priority to U.S. Provisional Patent Application No. 63/154,535, filed on Feb. 26, 2021, which application is incorporated herein by reference in its entirety for all purposes.

BACKGROUND

A computer network may facilitate the exchange, and/or delivery, of data packets between a server and a client node, or between multiple client nodes, to distribute data packets to users. For example, each client node may be associated with a user. In some instances, the distribution of data packets from the server to a client node may be based at least in part on information associated with data packets.

Often, the same data packets may be broadcast to all client nodes. However, this may create unnecessary traffic over the network and an overload of information for the recipient users. Further, the transmitting user may find it difficult to track the broadcasted communication with each recipient user. This problem has intensified with the increasing use of mobile devices that allows for the timeless and remote transmission, receipt, and access of data by users. In order to facilitate more efficient communication between users, a more sophisticated approach towards the generation and distribution of communications for workflow may be required.

SUMMARY

Recognized herein is a need for computer networks for delivering highly customized, relevant, optimized communications (e.g., interactive data units) to selected or segmented client nodes in a computer network. Systems and method herein provided a user (e.g., transmitting users) with an online/mobile platform configured to deliver dynamically-generated interactive data units to recipient users and track relevant user performance metrics of such interactive data units.

A client node may be associated with, and/or be accessible by, a user. In some instants, the interactive data units received at, or accessible by, a client node may be used to identify and alter an appearance of an item image, the item description, icon, and/or any data field associated with an item matched with the interactive data units. The interactive data units may be activated or engaged by the user associated with the client node, by facilitating transactions with respect to the item which appearance has been altered. Beneficially, the delivery of interactive data units may be readily integrated into a user experience by graphically distinguishing items associated with the interactive data units from items that are not associated with the interactive data units. This provides a user with a visually appealing interface while providing rich information associated with the items on a web page, and thus provides an enhanced user experience. In the setting of online shopping (e.g., grocery pickup and delivery orders), it can be difficult to determine which product qualifies for an offer. For example, an offer for Brand A cereal may only apply to a 16.9 OZ box but not the family-sized variant, or an offer for Brand B cereal may only apply to certain types but not for others. While shopping in-store, a user can sometimes scan a particular item's barcode (e.g., via a mobile device application) to verify that the item qualifies for an offer, but it is not immediately apparent whether a product is qualified for an offer on a web browser or a mobile website. Further, there is need to show the users whether a product qualifies for a category-level offer on websites when the items are not specified (e.g., all cereals are 20% off today). The highlighting feature described herein displays items qualified for an offer in a graphically distinct manner, which helps a user to quickly identify the particular products in an online context, and thus reduces the probability of missed credits, missed cash rewards, and improves user satisfaction.

In some embodiments, the highlighting feature is not only applied to a category or site-wide level offers; it also applied to other offers received from manufactures, brand operators, and the like, thus it focuses on a broader business context. That is, the interactive data units may be associated with items across different web sites or manufactures; therefore, a user may enjoy the rewards provided by an interactive data unit regardless which web sites the user purchases the item.

In some embodiments, the highlighting feature may indicate a price comparison across different web sites, online sellers, and the like, to show the different prices offered by different sellers. It thus enables a user to choose a seller to purchase an item/a product. In some embodiments, the price comparison may also indicate the lowest price offeror in a graphically distinct manner, and thus enable a user to make informed purchase decisions. The systems and methods described herein contain numerous improvements to handle, speed, accuracy, and database size to enable the feature. In some instances, a computer network may facilitate delivery of different images based on an interactive data unit to a client node based on the information associated with the interactive data unit.

In an aspect, provided herein is a computer-implemented method for providing real-time graphically distinct items in a user experience, comprising: retrieving, by one or more computer processors, item data associated with an item of a plurality of items from a web page, the item data comprising an item description; identifying, by the one or more computer processors, the item from the plurality of items as matching with one or more of a plurality of interactive data units by using one or more matching algorithms; altering an appearance of the item description associated with the item, to generate a modified item description; and displaying the modified item description in the web page to graphically distinguish the item from the plurality of items as matched with the one or more of the plurality of interactive data units. In some embodiments, the method further comprises prior to retrieving item data associated with an item of a plurality of items from a web page, receiving a user request to access the web page from a client node of a user. In some embodiments, the modified item description highlights the item from the plurality of items on the web page, wherein the modified item description comprises an additional graphical element compared to item descriptions of remaining items of the plurality of items on the web page, and wherein the additional graphical element comprises a symbol, or an outline along a periphery of the item description, or both. In some embodiments, the item data further comprises an item name and an item identification number. In some embodiments, the method further comprises processing the item description, by the one or more computer processors, to determine that the item description represents the item based at least in part on the item name and the item identification number. In some embodiments, wherein altering the appearance of the items description associated with the item comprises inserting a price comparison across different item providers.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
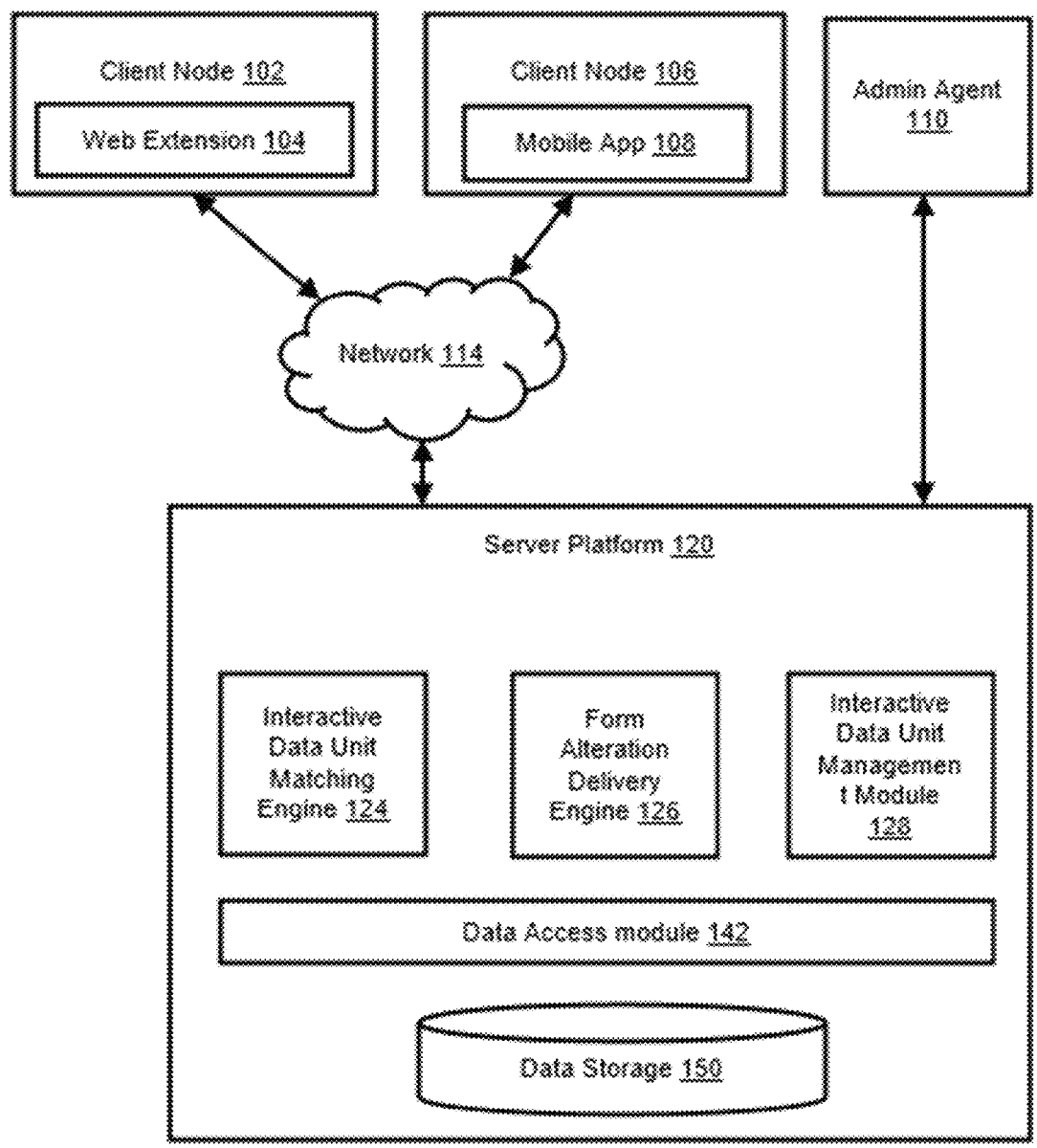
FIG. 1 is a block diagram depicting an example system 100, according to embodiments of the present disclosure, comprising a client-server architecture and network configured to perform the various methods described herein.

FIG. 1 is a block diagram depicting an example system 100 comprising a client-server architecture and network configured to perform the various methods described herein. A platform (e.g., machines and software, possibly interoperating via a series of network connections, protocols, application-level interfaces, and so on), in the form of a server platform 120, provides server-side functionality via a communication network 114 (e.g., the Internet or other types of wide-area networks (WANs), such as wireless networks or private networks with additional security appropriate to tasks performed by a user) to one or more client nodes 102, 106, and/or administration (admin) agent 110. FIG. 1 illustrates, for example, a client node 102 hosting a web extension 104, thus allowing a user to access functions provided by the server platform 120, for example, receiving an interactive data unit from the server platform 120. The web extension 104 may be compatible with any web browser application used by a user of the client node. Further, FIG. 1 illustrates, for example, another client node 106 hosting a mobile application 108, thus allowing a user to access functions provide by the server platform 120, for example, receiving an interactive data unit from the server platform 120. Delivery may be through a wired or wireless mode of communication. The interactive data unit may include, without limitation, a form that is intended to solicit user response or a form that is intended to elicit user activity or response. Examples of interactive data unit include, without limitation, notifications, offers, and alerts.

A client node (e.g., client node 102 and/or client node 106) may be, for example, a user device (e.g., mobile electronic device, stationary electronic device, etc.). A client node may be associated with, and/or be accessible to, a user. In another example, a client node may be a computing device (e.g., server) accessible to, and/or associated with, an individual or entity. A client node may comprise a network module (e.g., network adaptor) configured to transmit and/or receive data. Via the nodes in the computer network, multiple users and/or servers may communicate and exchange data, such as interactive data units. In some instance, the client nodes may receive and present to a user an Internet-featured item (e.g., an image of a product). The client nodes may transmit information associated with the item to the server platform 120. Examples of the information associated with the item include, without limitation, item name (e.g., product name), item unique identification number (e.g., product Universal Product Code (UPC)), item barcode, item price, item size, item weight, image URL, product URL, etc.

In at least some examples, the server platform 120 may be one or more computing devices or systems, storage devices, and other components that include, or facilitate the operation of, various execution modules depicted in FIG. 1. These modules may include, for example, interactive data unit matching engine 124, form alteration delivery engine 126, interactive data unit management module 128, data access modules 142, and data storage 150. Each of these modules is described in greater detail below.

The interactive data unit management module 128 may receive parameters regarding one or more interactive data units devised by providers or creators of the interactive data units (e.g., manufacturers, retailers, and other entities) for possible presentation to one or more users. In an example, such parameters may include the type of interactive data (e.g., deliverable to client nodes associated with new customers, deliverable to client nodes associated with customers of competitors, deliverable to client nodes associated with loyal customers, deliverable to client nodes associated with other types of customers, etc.), the items (e.g., products) to be purchased and any customer user attributes that can trigger the delivery of the interactive data unit to a client node of a user, the terms of the reward or incentive resulting from activation of the interactive data, any expiration date or time associated with the interactive data units, and so on. In some embodiments, when an interactive data unit is expired, the interactive data unit management module 128 automatically removes it from the available interactive data unit inventory, and cooperate with interactive data unit matching engine 124 and form alteration delivery engine 126 to provide real-time user experience, as discussed elsewhere herein. The user of the client nodes 102 and/or 106 may devise such interactive data unit, modify the interactive data unit in response to interim results regarding the interactive data, and engage in related activities via the interactive data unit management module 128. In a further example, the parameters may include specific product information (e.g., item information) which may be received by a client node, for example, the UPC associated with a product which has a reward if purchased by a user.

The interactive data unit matching engine 124 may match interactive data units defined or generated by various manufacturers, merchants, retailers, or other entities as set forth by the parameters defining the interactive data units. In some embodiments, the interactive data unit matching engine 124 of the server platform 120 receives information associated with an item from the client node 102 or 104, as described elsewhere herein. For example, a user associated with a client node 102 or 104 may request to access a web page. The client node 102 or 104 may retrieve item information from the web page and send to the interactive data unit matching engine 124 of the server platform 120. The information associated with the item include, without limitation, item name (e.g., product name), item unique identification number (e.g., product Universal Product Code (UPC)), item barcode, item price, item size, item weight, image URL, product URL, etc. The interactive data unit matching engine 124 may match the received item information with the interactive data units to identify the matched items (e.g., products associated with an offer, reward, etc.). In some embodiments, the interactive data unit matching engine 124 may perform the matching operation by comparing the UPCs of the received items against the UPCs of the interactive data units. In some other embodiments, the interactive data unit matching engine 124 may perform the matching operation by comparing the items name (e.g., including brand name, producer, etc) of the received item against the listed name of the interactive data units. In some further embodiments, a user identification information and/or purchase history may be taken into consideration when determine whether the user associated with a client node is qualified to receive the particular interactive data unit based on the parameters associated with the interactive data unit. Once the interactive data unit matching engine 124 determines that there is a match between the received item and an interactive data unit, the interactive data unit matching engine 124 may link the received item with the matched interactive data unit, and send the matched pair (e.g., data of the linking) to the form alteration delivery engine 126.

The form alteration delivery engine 126 may alter an appearance of an item image, an item description, icon, and/or any data field associated with the matched items (e.g., based on the linked interactive data units), to generate modified item images. For example, the form alteration delivery engine 126 may highlight the item image by putting a colored box around the original item image. The colored box may be in various colors and may indicate different types of rewards associated with the interactive data units. In one example, a pink box is presented around the original product image, which may indicate there is a cash reward if a user buys this product. In another example, a green box is presented around the original product image, which may indicate there is a credit reward if a user buys this product. In some embodiments, the form alteration delivery engine 126 may highlight the item image by adding a tag to the original item image, such as a colored tag embedded with reward information.

The parameters associated with the interactive data unit may further include activation parameters, which indicate that the interactive data unit require a user to take certain steps or actions to receive a reward, such as clicking an icon (e.g., check box), or viewing a video or an advertisement. In some further examples, the form alteration delivery engine 126 may deliver the activation parameter associated with the interactive data unit when presenting the product to a user, such as a limitation associated with the interactive data unit. For example, the interactive data unit may have some restrictions/limitations regarding the condition of receiving a reward when buying the product, such as a user must buy two (2) of the product to receive a cash reward. In this case, the form alteration delivery engine 126 may alter the appearance of the product image to include a note of "Must Buy 2". The note (e.g., additional limitation associated with the interactive data unit) may be presented around the product image, in a corner of the product image, or in a modal popup that may be activated by a user when interact with the interactive data unit linked with the matched item (e.g., a product matched with an offer). In these cases, the interactive data units are activable upon satisfaction of the activation parameter by a user of the client node. For example, if the activation parameter associated with an interactive data unit reads "Must also buy product B", then when the user buys product B and this instant product, the reward associated with interactive data unit will appear to be available (alternatively, added to the user's digital wallet or equivalent) to the user. In yet other embodiments, the form alteration delivery engine 126 may deliver an icon indicating there is an offer associated with an item to the client nodes. While some examples of appearance alterations are provided, it will be appreciated that the form alteration delivery engine 126 may graphically modify the display of the item (e.g., item image, item description, icon, and/or any data field associated with the item) in any matter, including adding any graphical element (e.g., box around the boundary, symbol, icon, text, etc.), changing a color scheme, deleting any graphical element, or otherwise modifying the item image from the original image to a modified image to graphically distinguish the item from a plurality of items via the modified item image displayed on a web page to the user. Further, the form alteration delivery engine 126 may display the modified item appearance on a receiving client node to present to the user associated with the client node.

The form alteration delivery engine 126 may alter an appearance of any data fields associated with the interactive data units. For example, the form alteration delivery engine 126 may insert a tag indicating a price comparison which compares the prices offered by different sellers associated with the item or product. This may provide a user with information indicating that there is another seller offering the same product with a lower price (as shown by element 804 in FIG. 8). This graphically distinct tag may provide a user with a price comparison without requesting the user to visit other online stores to gather the information. Additionally or alternatively, this graphically distinct tag may include a URL linking to other sellers' website to enable a user to purchase the product from another seller's website.

The form alteration delivery engine 126 may alter an appearance of any data fields associated with the interactive data units in real-time or near real-time. That is, the appearance of the data fields associated with the interactive data units may be updated in real-time based on user's interaction with the interactive data units. In some embodiments, once the items that matches with one or more interactive data units are presented on a visible screen for a user, the form alteration delivery engine 126 alters the appearance of the items images of the items. As used herein, "real-time" may also include near real-time or substantially real-time. Real-time can include a response time of less than 1 second, tenths of a second, hundredths of a second, or a millisecond. Real-time can also refer to the simultaneous or substantially simultaneous occurrence of a first event (e.g., attribution) relative to a second event (e.g., data becoming available or otherwise accessible).

Data access modules 142 may facilitate access to data storage 150 of the server platform 120 by any of the remaining modules 124, 126, and 128 of the server platform 120. In one example, one or more of the data access modules 142 may be database access modules, or may be any kind of data access module capable of storing data to, and/or retrieving data from, the data storage 150 according to the needs of the particular module 124, 126, and 128 employing the data access modules 142 to access the data storage 150. Examples of the data storage 150 include, but are not limited to, one or more data storage components, such as magnetic disk drives, optical disk drives, solid state disk (SSD) drives, and other forms of nonvolatile and volatile memory components.

As shown in FIG. 1, admin agent 110 may be coupled directly to the server platform 120, thus circumventing the network 114. For example, the admin agent 110 may be co-located with the server platform 120, coupled thereto via a local network interface. In another example, the admin agent 110 may communicate with the server platform 120 via a private or public network system, such as the network 114.

At least some of the embodiments described herein with respect to the system 100 of FIG. 1 provide various techniques for generating, and delivering to client nodes, interactive data units which are activateable, or otherwise engageable, by user input, user activity, and/or user response. For example, the interactive data units may be activateable by user activity such as the purchase of products, services, and the like. The activation of an interactive data unit may output the delivery of a value to a client. For example, the value may be a credit (e.g., financial credit, rewards, points, value, etc.) transmitted to a user's account. In some instances, a user may receive, or redeem, the value by activating the interactive data unit. An interactive data unit may be personalized or tailored to the customer receiving the interactive data unit at the selected client node (e.g., user device). In some embodiments, the system 100 of FIG. 1 provides various techniques for altering the appearance of an Internet-featured item if the item is identified to have a corresponding interactive data unit (e.g., a matched offer).

Figure 2:
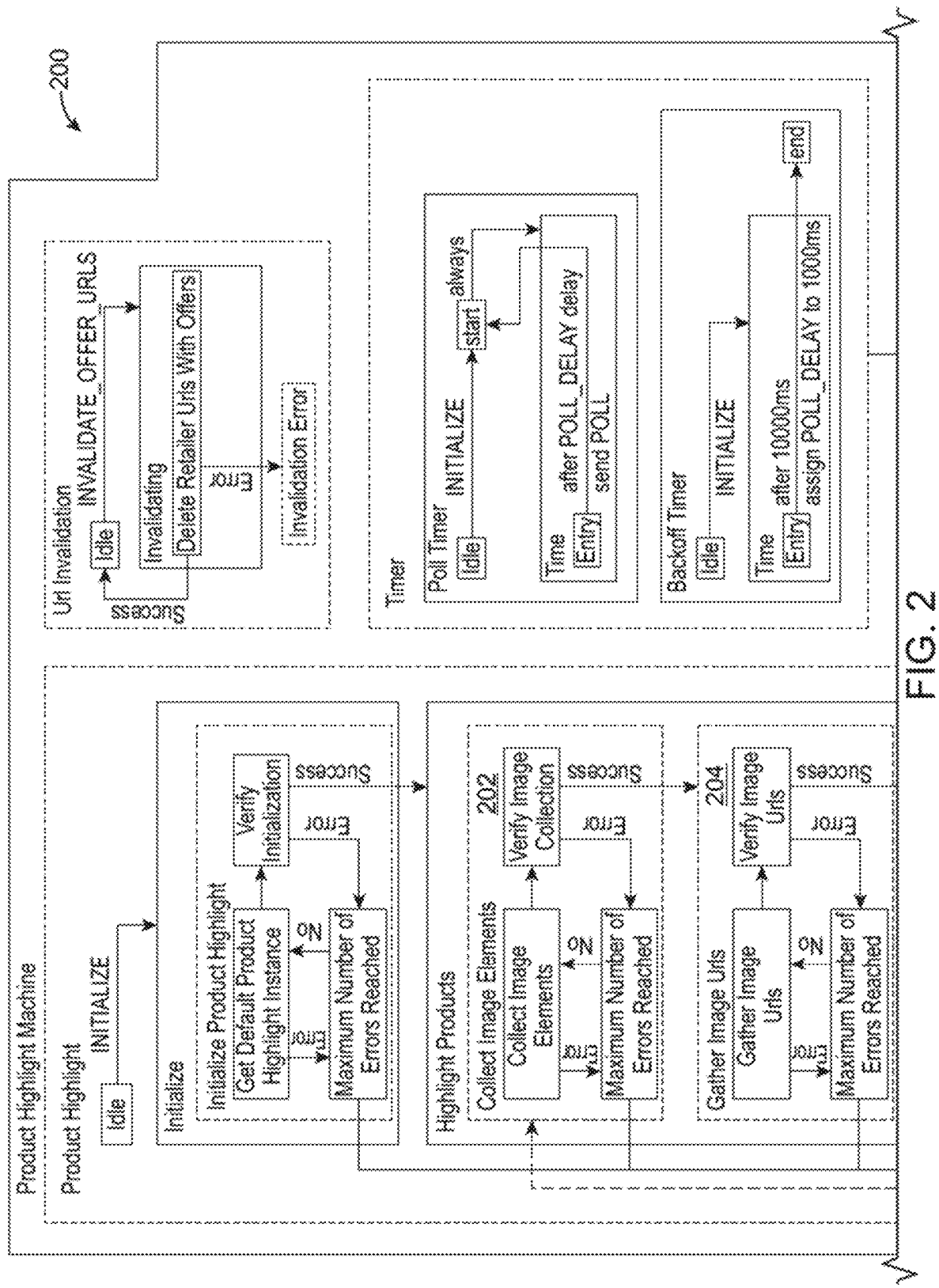
FIG. 2 is a flow diagram depicting an example process 200 for altering an appearance of an Internet-featured item, according to one exemplary embodiment.
Figure 2:
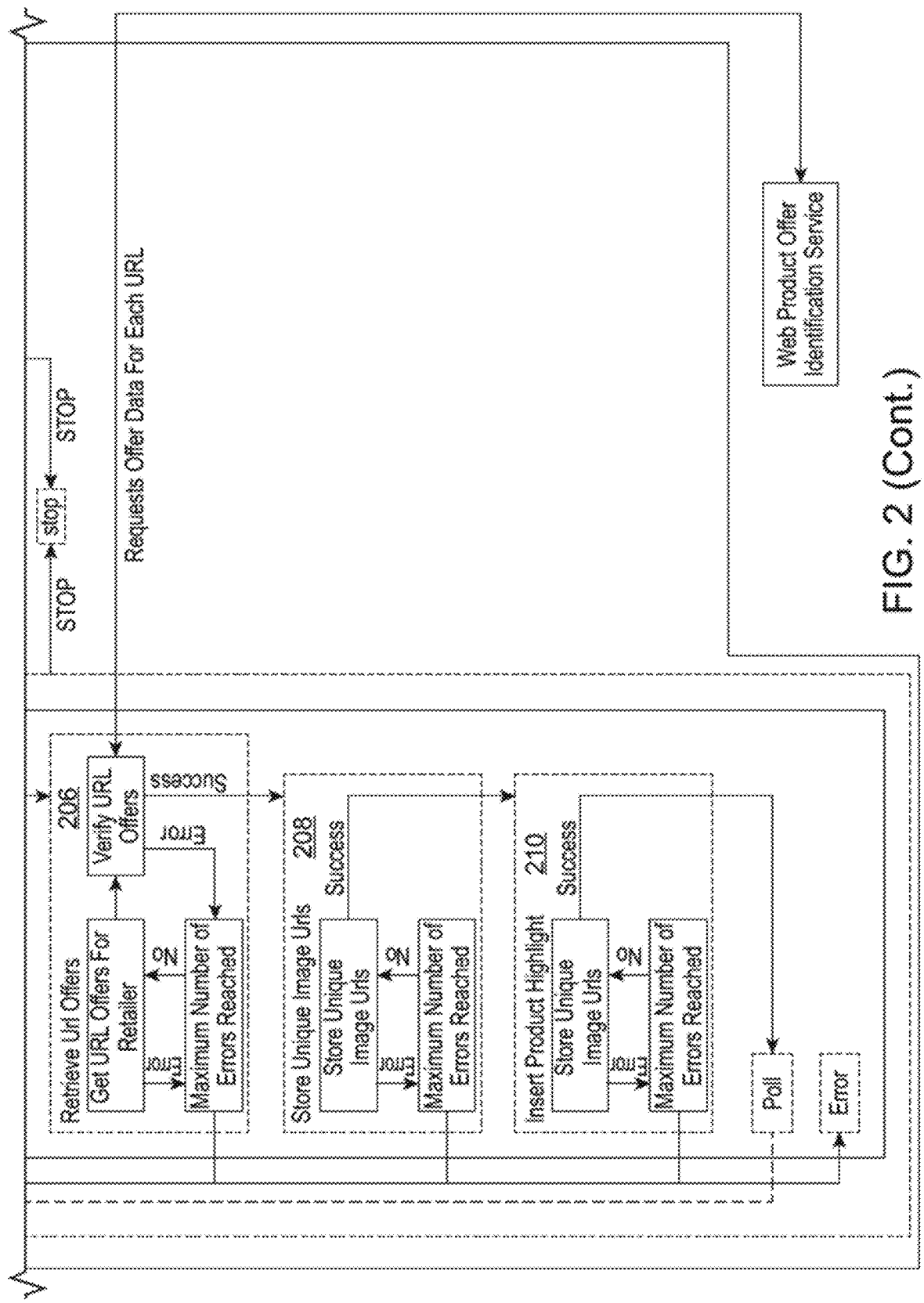

FIG. 2 is a flow diagram depicting an example process 200 for altering an appearance of an Internet-featured item, according to one exemplary embodiment. As depicted in FIG. 2, once the platforms and systems of the present disclosure is initialized, the process 200 begins with operation 202, wherein the system 100 collects image elements. Although image elements are used as an example in FIG. 2, the system 100 may collect any other item information that may identify an item (e.g., product), such as item name (e.g., product name), item unique identification number (e.g., product Universal Product Code (UPC)), item barcode, item price, item size, item weight, image URL, product URL, etc. In some embodiments, the client nodes 102 and 106 may collect item information associated with one or more Internet-featured items (e.g., products) that are shown on a client node. For example, if a client node is accessing a website that contains products for sale, these product items may be presented on the client node of a user in a form of image of the product combined with other information, such as item price, color, size, product UPC, and the like. In some other embodiments, the client nodes 102 and 106 collects item information (e.g., item name (e.g., product name), item image, image elements, item unique identification number (e.g., product Universal Product Code (UPC)), item barcode, item price, item size, item weight, image URL, product URL, etc.) from the web page that is presenting on the client nodes, and the following web pages that has not yet be presented on the client nodes. Further, the client nodes 102 and 106 may verify the image collection (e.g., in terms of completeness). Once the image collection is verified, the process 200 proceeds to operation 204, wherein the system 100 gathers image URLs. In some embodiments, the client nodes 102 and 106 may gather the image URLs by various techniques, for example, by commands that fetch the image properties, inspect the image, and/or view the image info, etc. In some embodiments, the operation 204 also comprises verifying the gathered image URLs, wherein the system 100 verifies whether the image accurately represents the product it depicts. This may be performed by gathering the relevant information associated with the Internet-featured item, such as product UPC, unique identification numbers, Meta Data of the product (size, weight, price . . . etc.) and perform an error check to ensure that the image of the gathered image URL is for the product it depicts.

The process 200 may then proceed to operation 206, wherein the system 100 sends the collected and verified item information (e.g., item image, image URL, product name, product UPC, product metadata, etc.) to a web product offer identification service and retrieve interactive data units (offers) that may be associated with the particular Internet-featured item. In some embodiments, this may be performed by one or more matching algorithms that match the gathered item information with the available interactive data units stored in the web product offer identification service. When there is a match between the item and an interactive data unit (e.g., offer), the image URL of the Internet-featured item is verified to be associated with an offer in operation 206; this may create a resulting unique image URL in operation 208. In operation 208, the resulting unique image URL may be stored for future use.

Next, in operation 210, the system 100 may alter the appearance of the Internet-featured item by inserting product highlighting feature to the image for that item. For example, the system 100 may alter the appearance of the Internet-featured item by putting a colored box around the original product image. The colored box may be in various colors and may indicate different types of rewards associated with the interactive data units. In one example, a pink box is presented around the original product image, which may indicate there is a cash reward if a user buys this product. In another example, a green box is presented around the original product image, which may indicate there is a credit reward if a user buys this product. In some further examples, the system 100 may deliver some other information associated with the interactive data unit to present the product to a user, such as a limitation associated with the interactive data unit. For example, the interactive data unit may have some restrictions/limitations regarding the condition of receiving a reward when buying the product, such as a user must buy two (2) of the product to receive a cash reward. In this case, the system 100 may alter the appearance of the product image to include a note of "Must Buy 2". The note (e.g., additional limitation associated with the interactive data unit) may be presented around the product image, in a corner of the product image, or in a modal popup that may be activated by a user when interact with the Internet-featured item (e.g., a product matched with an offer).

At least some of the embodiments described herein with respect to the process 200 of FIG. 2 provide various techniques for generating, and delivering to client nodes, interactive data units which may alter the appearance of the Internet-featured items if the item is identified to have a corresponding interactive data unit (e.g., offer). For example, A browser Extension, Web Browser, Mobile Web Browser, or application of client nodes may scrape a third-party web page (e.g., a retailer web page) and obtain Identification formation for the products on that page or subsequent pages. The identification information may include Image URL, Product UPC, Unique Identification numbers, meta data (size, weight, price, etc.), or image scan. The system 100 may collect and store the data on that page to verify that the image accurately represents a product or products. The system 100 may gather the relevant identification information and perform error checks to ensure it is of the expected type for the retailer in question. The process 200 contains a process by which the identification information is sent to a back-end service (e.g., web product offer identification service) to obtain verification that the object in question accurately represents a product for which the service has an offer. A success code (i.e., there is an offer matches the item) is generated for the identification information and the system 100 uses this information to determine that the Highlight should be placed on, over, or near one or more specific elements in the web page. Also noted that the success code may trigger a notification to display in the Browser Extension Panel or the Mobile Web toolbar of the client nodes 102 and 106. A Browser Extension or Mobile Web client of the client nodes may detect multiple elements both in the field of view and outside of the field of view of a user of the client node, to proactively identify the relevant Data sources (e.g., a web page contains product information).

Figure 3:
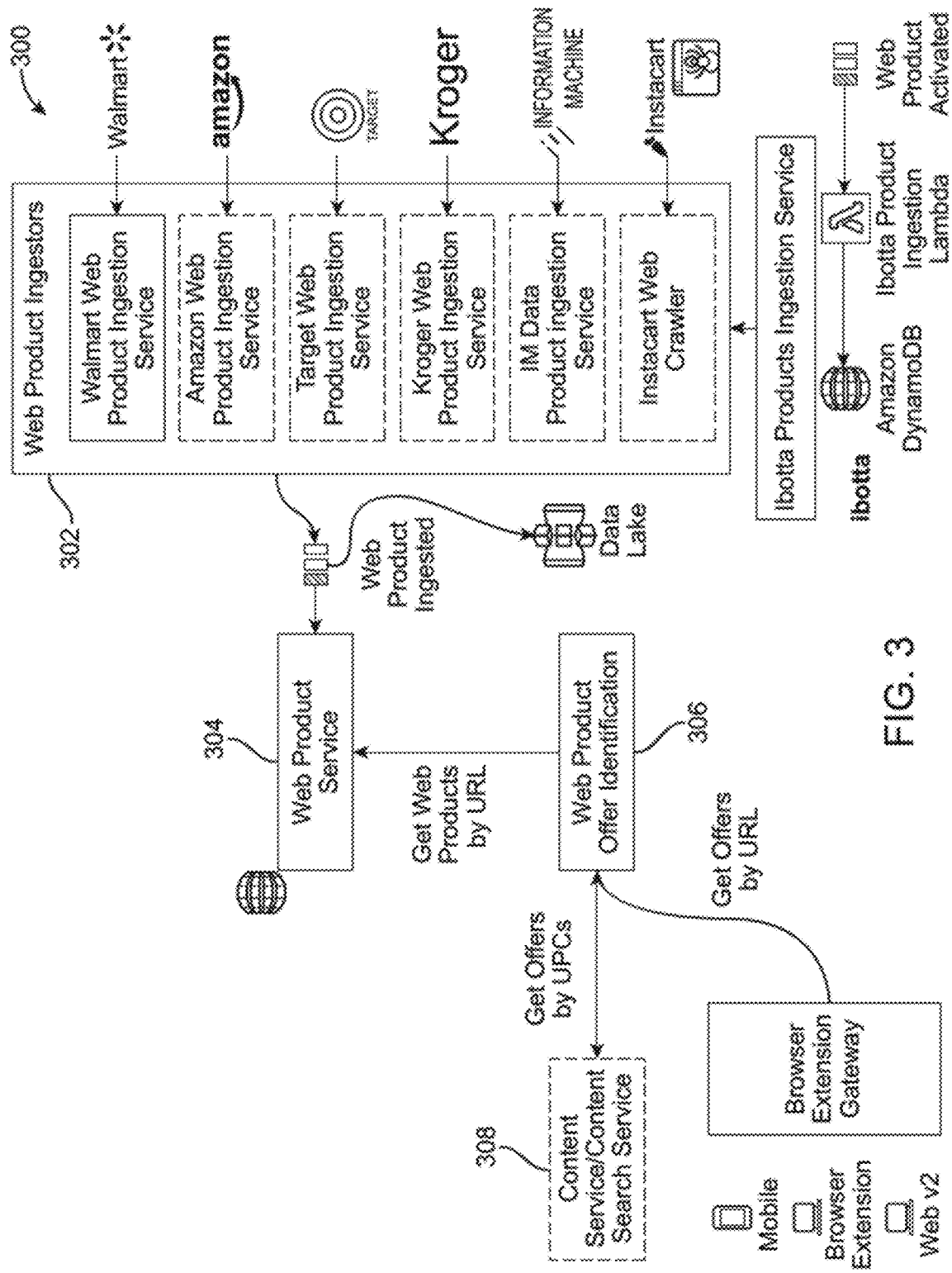
FIG. 3 is a block diagram depicting an example system 300, according to embodiments of the present disclosure, comprising a server architecture and network configured to perform the various methods described herein.

FIG. 3 is a block diagram depicting an example system 300, according to one exemplary embodiment, having a server architecture and network configured to perform the various methods described herein. An information ingestor (e.g., machines and software, possibly interoperating via a series of network connections, protocols, application-level interfaces, and so on), in the form of a web product ingestor 302, provides information gathering functionality via a communication network (e.g., the Internet or other types of wide-area networks (WANs), such as wireless networks or private networks with additional security appropriate to tasks performed by a user) to web product service 304. In some embodiments, the web product ingestor 302 may obtain information associated with web products (e.g., Internet-featured items, products for sale on a website) from a retailer or a retailer's web page. The information may include product metadata, such as product name, identification code, UPC, size, weight, price, product description, and other relevant information. The information can be obtained from a direct API, a 3rd party website or by scraping web pages to obtain the various information. The information may be stored in a data storage (e.g., data storage 150 of system 100), which may be a cloud-based database for future use by the server platform 120 or one or more client nodes 102 and 106.

As illustrated in FIG. 3, a data lake may be utilized to store the information associated with web products. In some embodiments, this information may be used by the interactive data unit matching engine 124 to match an item received from a client node with available offers. As illustrated in FIG. 3, a web product service 304 receives information associated with web products from the web product ingestor 302. In some embodiments, when the web product service 304 receives information contains an interactive data unit (e.g., an offer) with a new UPC, it checks with web product offer identification service 306 to determine whether this UPC already exists in the database for that particular offer provider (e.g., an interactive data unit provider, such as retailer, product manufacturer, etc.). For example, if the web product service 304 receives an offer (e.g., interactive data unit) that gives $1.5 cash-back to anyone who buys a box of Brand A cereal from Supermarket B, then the web product service 304 checks with web product offer identification service 306 to see whether the UPC associated with Brand A cereal for supermarket B exists in database. If the UPC does not exist, the system 300 may query API of the supermarket B to collect the UPC information, or the system 300 may trigger a page to scrape the website of the supermarket B to gather the relevant data. The relevant data may be stored in a product graph (e.g., a database, including a graph database) to provide the UPC and other information of the web product for future use by the system 300. If the relevant data is not found, the system 300 may respond by an error alert for future analysis. The web product offer identification service 306 receives information associated with a web product (e.g., Internet-featured item) from client nodes via browser extension gateway or mobile application, and obtains a matching UPC of the web product from the database storing existing UPC. The matching UPC is then sent to content service 308 to determine if there is any matching interactive data unit (e.g., offer) for that specific UPC. If a matching interactive data unit is found, then the system 300 sends a command to the client nodes, which triggers a change of appearance (e.g., highlighting the product image, showing a note around or near a product image, etc.) of the web product on the client nodes.

Figure 4:
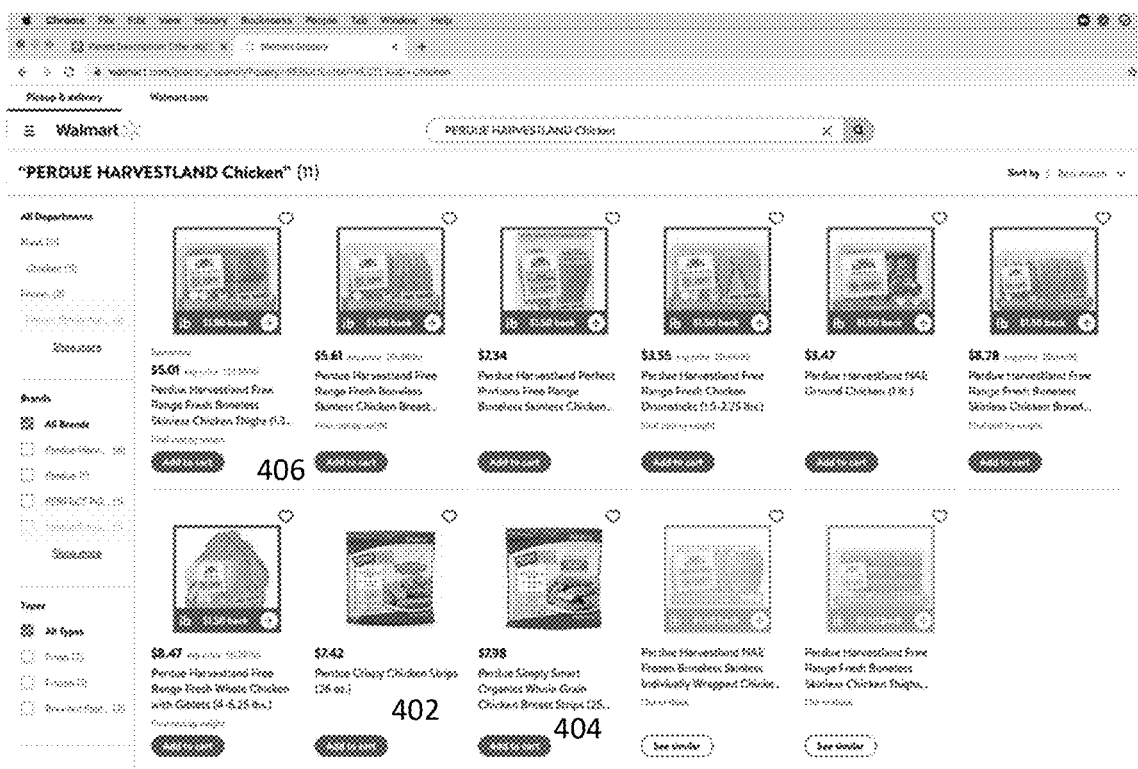
FIG. 4 illustrates an example user interface provided on a client node, according to one exemplary embodiment.

FIG. 4 is graphical representations of an example user interface provided on the consumer client node 102 of FIG. 1. In this example, the consumer client node 102 may be a desktop or laptop computer system, and the Internet-featured items (e.g., products) and interactive data units (e.g., offers) are presented via a web browser window of the client node 102. The web browser of the client node 102 may feature a browser extension 104, wherein the browser extension 104 may be compatible with any web browsers. The web browser window of the client node 102 provides a user access to the Internet-featured items and the interactive data units, as well as facilitates user interactions with the Internet-featured items and the interactive data units. In some embodiments, a browser extension to the web browser may be utilized to display various forms and/or related information of the interactive data units. The browser extension 104 may scrape a retailer's website in real-time (or near real-time) to identify products and send that product information to the server platform (e.g., server platform 120) to identify relevant offers.

As depicted in FIG. 4, an Internet-featured item 402 may be presented in a form of a product image and some other information, such as the product price is $7.42, the product name is Perdue Crispy Chicken Strips, and the product weight is 26 oz. The Internet-featured item 402 may also be associated with one or more icons through which a user may interact with the item, such as "add to cart" as shown in FIG. 4. As depicted in FIG. 4, an Internet-featured item 404 may be presented in a form of a produce image and some other information, such as product price is $7.98, and the product name is Perdue Simple Smart Organics Whole Grain Chicken Breast Strips. The browser extension may feature one or more interactive data unit 406 on the same web page to indicate there is an offer associated with the product. For example, the interactive data unit 406 may be presented with a colored box around the product image, wherein the colored box may be in various colors. This feature highlights the products for which there is an offer and displays the products in a graphically distinct manner comparing to the Internet-feature items 402 and 404. As depicted in FIG. 4, some additionally information may also be presented along with the highlighted product, such as $1.5 back, which specifies the rewards associated with the offer. A user may interact with the interactive data unit 406 by clicking the "add to cart" icon, or other icons associated with the product image.

Figure 5A:
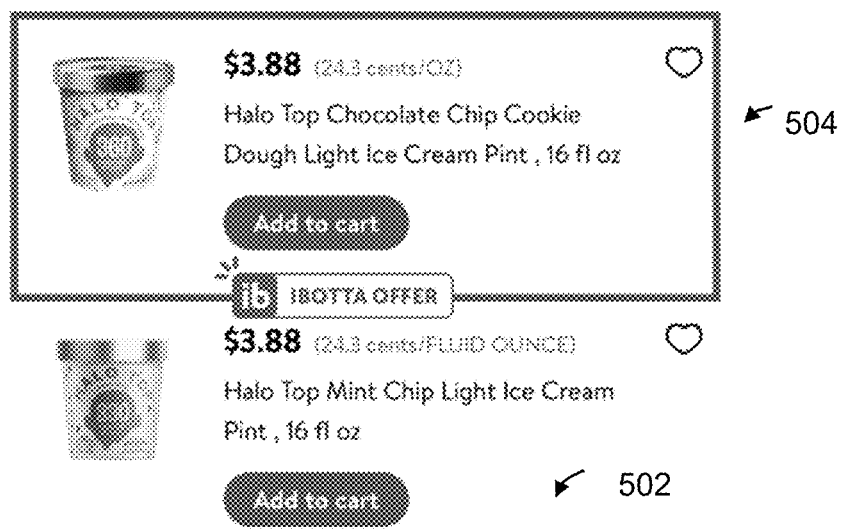
FIG. 5A illustrates an example user interface containing interactive data units provided on a client node, according to one exemplary embodiment.

FIG. 5A is graphical representations of an example user interface containing interactive data units provided on the consumer client node 106 of FIG. 1. In this example, the consumer client node 106 may be a mobile device, and the Internet-featured items (e.g., products) and interactive data units (e.g., offers) are presented via a mobile device application of the client node 106. The mobile device application of the client node 106 provides a user access to the Internet-featured items and the interactive data units, as well as facilitates user interactions with the Internet-featured items and the interactive data units. In some embodiments, a mobile device application may be utilized to display various forms and/or related information of the interactive data units. The mobile device application may scrape a retailer's website in real-time (or near real-time) to identify products and send that product information to the server platform (e.g., server platform 120) to identify relevant offers.

As depicted in FIG. 5A, an Internet-featured item 502 may be presented in a form of a product image and some other information, such as the product price is $3.88, and product name is Halo Top Mint Chip Light Ice Cream Pint, and the product weight is 16 fl oz. The Internet-featured item 502 may also be associated with one or more icons through which a user may interact with the item, such as "add to cart" as shown in FIG. 5A. The mobile device application may feature one or more interactive data unit 504 on the same window to indicate there is an offer associated with the product. For example, the interactive data unit 504 may be presented with a colored box around the product image, wherein the colored box may in various colors. This feature highlights the products for which there is an offer and displays the products in a graphically distinct manner comparing to the Internet-feature item 502. As depicted in FIG. 5A, some additionally information may also be presented along with the highlighted product, such as "ib Ibotta offer", which indicates there is a rewards associated with the offer. A user may interact with the interactive data unit 504 by clicking the "add to cart" icon, or other icons associated with the product image.

Figure 5B:
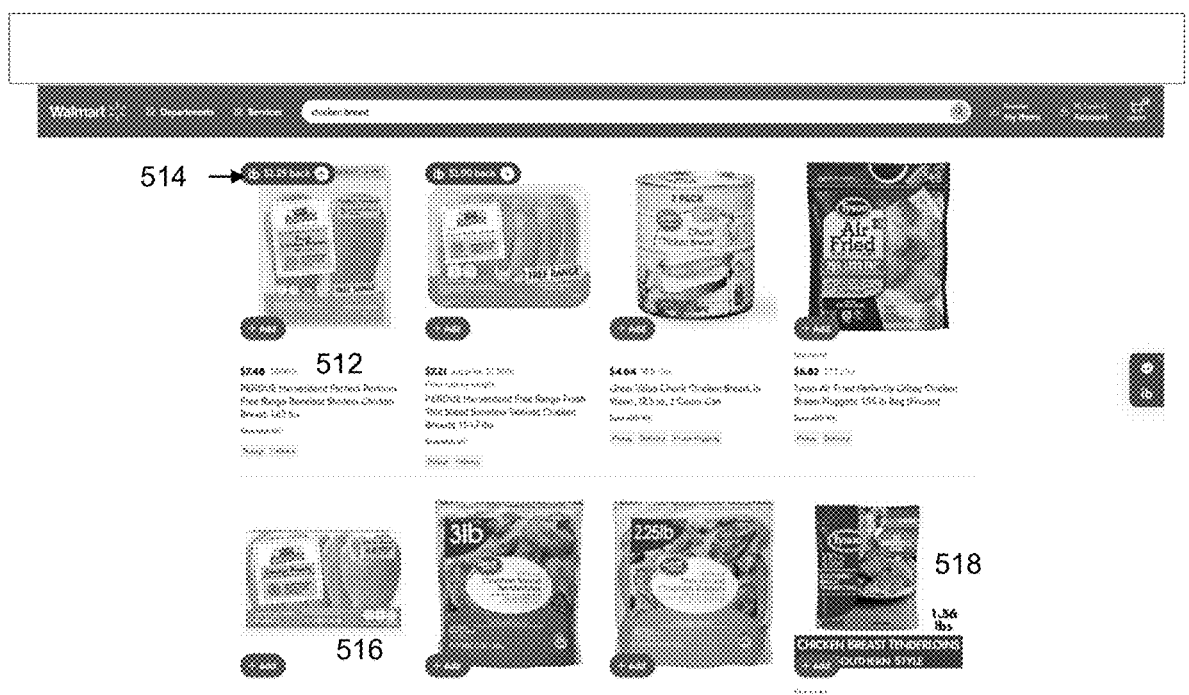
FIG. 5B illustrates an example user interface containing interactive data units provided on a client node, according to one exemplary embodiment.

FIG. 5B is a graphical representations of an example user interface containing interactive data units provided on the consumer client node 102 of FIG. 1. In this example, the consumer client node 102 may be a desktop or a laptop computer system, and the Internet-featured items (e.g., products) and interactive data units (e.g., offers) are presented via a web browser window of the client node 102. The web browser of the client node 102 may feature a browser extension 104, wherein the browser extension 104 may be compatible with any web browsers. The web browser window of the client node 102 provides a user access to the Internet-featured items and the interactive data units, as well as facilitates user interactions with the Internet-featured items and the interactive data units. In some embodiments, a browser extension to the web browser, for example, a browser extension 104 on client node 102 as shown in FIG. 1, may be utilized to display various forms and/or related information of the interactive data units. The browser extension 104 may scrape a retailer's website in real-time (or near real-time) to identify products and send that product information to the server platform (e.g., server platform 120) to identify relevant offers.

As depicted in FIG. 5B, an Internet-featured item 512 may be presented in a form of a product image and some other information, such as product price is $7.98, and the product name is Perdue Simple Smart Organics Whole Grain Chicken Breast Strips. The Internet-featured item 512 may also be associated with one or more icons through which a user may interact with the item, such as "+Add" as shown in FIG. 5B. The browser extension may feature one or more interactive data units 514 on the same web page to indicate there is an offer associated with the product. For example, the interactive data unit 514 may be presented with a colored tag overlapping with the product image, wherein the colored tag may be in various colors. This feature highlights the products for which there is an offer and displays the product in a graphically distinct manner comparing to the Internet-feature items 516 and 518 (i.e., the items that do not have an associated offer). As depicted in FIG. 5B, some additional information may also be presented along with the highlighted product, such as $1.25 back, which specifies the rewards associated with the offer. A user may interact with the interactive data unit 514 by clicking the "$1.25 back+" or "+Add" icon, or other icons associated with the product image.

Figure 6:
FIG. 6 illustrates an example user interface containing interactive data units provided on client nodes, according to one exemplary embodiment.

FIG. 6 is graphical representations of an example user interface containing interactive data units provided on client nodes. As shown in FIG. 6, a page-injected set of code allows the browser extension or mobile device application to draw a colored box (e.g., pink) around a product image that qualifies for an offer. In some other embodiments, the page-injected set of code may put a simplified alteration of the appearance of the product image, such as presenting an offer icon. In some embodiments, the colored box may include additional information such as "Must Buy 2" or other limitations on the offer (not shown in FIG. 6). The colored box may include an icon for the user to access additional information on the offer in a modal popup (not shown in FIG. 6). The colored box may include an icon that displays more information received from the browser extension panel. A page-injected set of code can allow for a pink box or other identification (e.g., offer icon) to be drawn or placed around text fields or other graphical elements in the user's viewport. In some embodiments, as shown in FIG. 6, a graphical element may include a button or icon 602 for unlocking an item so that the offers indicate that they require an affirmative activation. In this example, the active state of the interactive data unit can display a checkmark 604 once the offer has been unlocked. In some embodiments, the active state of the interactive data unit can change color of the item image once the offer has been unlocked (e.g., from pink to green). In some embodiments, the process by which the unlocking an offer on platform IOS, Mobile web, offeror's website, or browser extension panel can change the state of the offer highlight. Once an offer is unlocked, it may be automatically added to the user's saved list. In some embodiments, the event of unlocking an offer may be transmitted to the server platform so that the user may receive credit. In some embodiments, a user does not need to be logged in to be able to receive the interactive data unit. The offer highlighting feature can display all offers whether they are unlocked previously or not.

In the setting of online shopping (e.g., grocery pickup and delivery orders), it is difficult to determine which product qualifies for an offer. For example, an offer for Brand A cereal may only apply to a 16.9 OZ box but not the family-sized variant, or an offer for Brand B cereal may only apply to certain types but not for others. While shopping in-store, a user can sometimes scan a particular item's barcode (e.g., via a mobile device application) to verify that the item qualifies for an offer, but it is not immediately apparent whether a product is qualified for an offer on a website or mobile website. Further, there is need to show users whether a product qualifies for a category-level offer on sites when the items are not specified. The highlighting feature described above displays items qualified for an offer in a graphically distinct manner, which helps a user to quickly identify the particular products in an online context, and thus reduces the probability of missed credits, missed cash rewards and improves user satisfaction. In some embodiments, the highlighting feature is not only applied to category or site-wide level offers; it also applied to other offers received from manufactures, brand operators, and the like, thus it focuses on a broader business context. The above described systems and process contain numerous improvements to handle, speed, accuracy, and database size to enable the feature. The following processes and components enable the above-mentioned features:

A process for client nodes (e.g., via browser extension/mobile web app) to actively scrape pages (e.g., web pages) in real-time to identify unique product data and injects 3rd party marketing contextual CTA visualizations into first-party web pages;

A process by which that unique identifier is reconciled with (e.g., added into if not already exist) a database of offers/products (e.g., interactive data unit management module and database, UPC database, product database, etc.);

A product database that is "self-healing" in nature and actively updates its contents to fill gaps in the data. For example, when a new UPC is received, the product database may update its contents to include this UPC and the related information, such as product name, size, weight, etc., as well as, in some instances if applicable, the product price on a particular retailer's website, this process is described with reference to FIG. 3;

A pluggable framework that can handle multiple retailer API's and data sources (e.g., a retailer's website, a manufactures inventory and/or offer list, etc.);

A set of user experiences (e.g., facilitated by browser extension/mobile web app) that respond to the data (e.g., product information, matched offer, receipt of an offer, etc.) to inform (e.g., present a notification, alert, etc.) a user that a particular product qualifies for an offer;

A process where "unlocking/activating" the offer on a platform updates the client nodes and allows the user to obtain cashback for purchasing the product;

A tool that allows admin agents to update the database for missing products manually.

Figure 7:
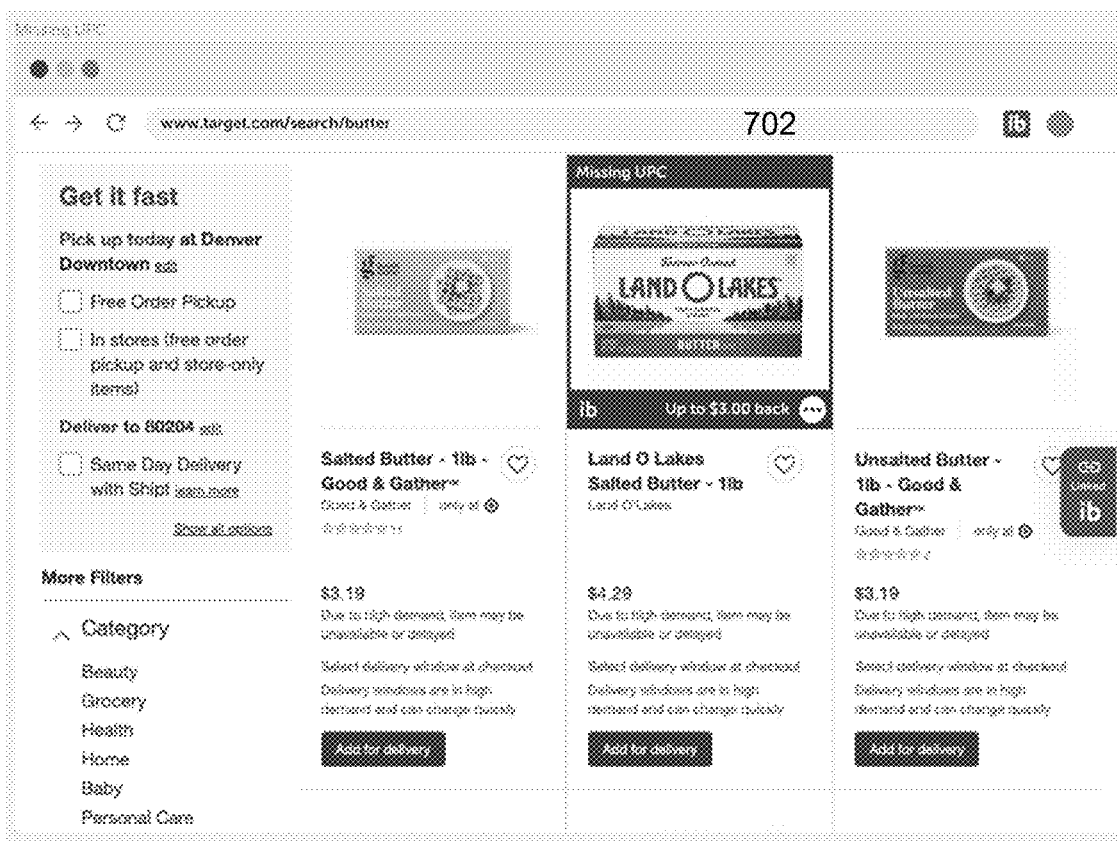
FIG. 7 illustrates an example user interface providing an administration agent access to alter the interactive data units, according to one exemplary embodiment.
Figure 7:

FIG. 7 is graphical representations of an example user interface providing an admin agent access to alter the interactive data units. As shown in FIG. 7, the system may notify an admin agent that an Internet-featured item is missing UPC associated with the item, as shown in 702. As described elsewhere herein, the matching process may use a UPC associated with the Internet-featured items to determine whether there is a matching offer. Therefore, when the system 100 cannot obtain the UPC of a received Internet-featured item, it may not be able to identify the matching offer. In some embodiments, the admin agent may modify the missing UPC that correspond to particular offers via the dashboard 704 manually. This admin agent tool exists in an administrator mode controlled by offeror's (e.g., Ibotta) feature flag system. When activated, the GEAR icon displays in the browser extension. An agent can navigate to a page containing the products that qualify for a specific offer. Products that are not part of the offer will be highlighted with a particular color (such as blue) so that the agent can perform a manual inspection. If the agent determines that the product should be associated with the offer, they can add it manually using the browser extension panel. This process adds redundancy to the system and improves offeror's (e.g., Ibotta) overall product matching performance for both in-store and online offers.

Figure 8:
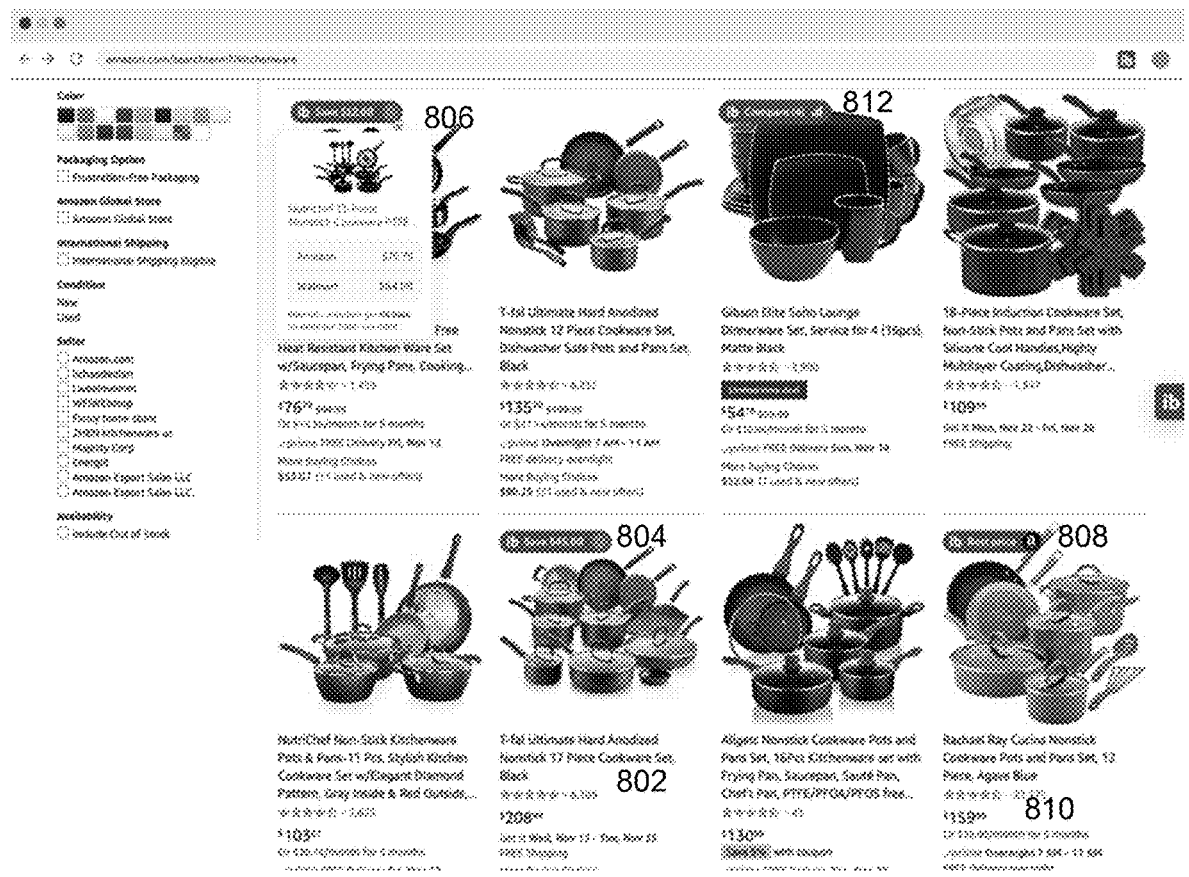
FIG. 8 illustrates graphical representations of an example user interface containing interactive data units provided on client nodes to provide price comparisons, according to one exemplary embodiment.

FIG. 8 is graphical representations of an example user interface containing interactive data units provided on client nodes. In this example, the consumer client node 102 may be a desktop or laptop computer system, and the Internet-featured items (e.g., products) and interactive data units (e.g., offers, price comparisons) are presented via a web browser window of the client node 102. The web browser of the client node 102 may feature a browser extension 104, wherein the browser extension 104 may be compatible with any web browsers. The web browser window of the client node 102 provides a user access to the Internet-featured items and the interactive data units, as well as facilitates user interactions with the Internet-featured items and the interactive data units. In some embodiments, a browser extension 104 to the web browser may be utilized to display various forms and/or related information of the interactive data units. The browser extension 104 may scrape a retailer's website in real-time (or near real-time) to identify products and send that product information to the server platform (e.g., server platform 120) to identify relevant offers. The browser extension 104 may also scrape other merchants' website in real-time (or near real-time) to identify products and send product information (e.g., prices) for the same product to the server platform (e.g., server platform 120).

As shown in FIG. 8, a page-injected set of code allows the browser extension or mobile device application to insert a colored tag (e.g., pink) on or near a product image that qualifies for an offer with a different price (e.g., lower price) from another merchant. For example, as depicted in FIG. 8, an Internet-featured item 802 may be presented in a form of a product image and some other information, such as the product price is $208.99, and the produce name is "T-fal Ultimate Hard Anodized Nonstick 17 Piece Cookware Set, Black". The browser extension 104 or mobile device application 108 may feature one or more interactive data unit 804 on or near the provide image to indicate there is another merchant selling the same product with lower price. As depicted in FIG. 8, a colored (e.g., pink) tag is inserted to the webpage, for example, the tag may indicate the amount would be saved if the user chooses to buy the product from another merchant. In some embodiments, the interactive data unit 804 (e.g., the tag indicating a price comparison) may also show an identifier associated the merchant offering a lower price on the same product. The identifier comprises, not limited to, a logo, a trademark, a stamp, a label, and the like. As depicted in FIG. 8, a Walmart logo is shown on the right side of the colored tag. In some embodiments, the logo for another merchant may feature with the merchant's usual brand color to enhance visibility and draw attention from a user. As depicted in FIG. 8, interactive data unit 804 may facilitate interaction between a user and the interactive data unit. For example, as shown by interactive data unit 806 shown in FIG. 8, if a user clicks on the tag, (e.g., part of the tag, merchant identifier, etc.), the interactive data unit 806 may expand to show the difference between prices provided by different merchants. The expanded presentation may comprise the prices each merchants offer, and additional information such as a membership benefits. In some embodiments, a URL link may be inserted in the expanded presentation to redirect a user to further information regarding offers, benefits, rewards, etc. The URL link may also redirect the user to the lower-price offerors' website, such as other merchants' websites.

In some embodiments, the interactive data unit, for example, the interactive data unit 808, may indicate that the current Internet-featured item 810 offers the lowest price for the same product across participating merchants. For example, the interactive data unit 808 shows "Best price" with a merchant identifier for "Amazon". In some embodiments, an interactive data unit 812 may show that there are several different merchants offering the same product, and invite a user to interact with the interactive data unit 812 to view the different prices offered by these merchants. As depicted in FIG. 8, the interactive data unit 812 may show "compare (4)", which indicates there are four (4) different merchants offering the same product. The interactive data unit 812 may be expanded, when a user interacts with it, to show the different merchants and their offered prices for this product. This feature of price comparison allows a user to compare prices with high clarity and ease, without having to view to different merchants' websites, and thus provide improvements to handle, speed, accuracy, and efficiency.

Figure 9:
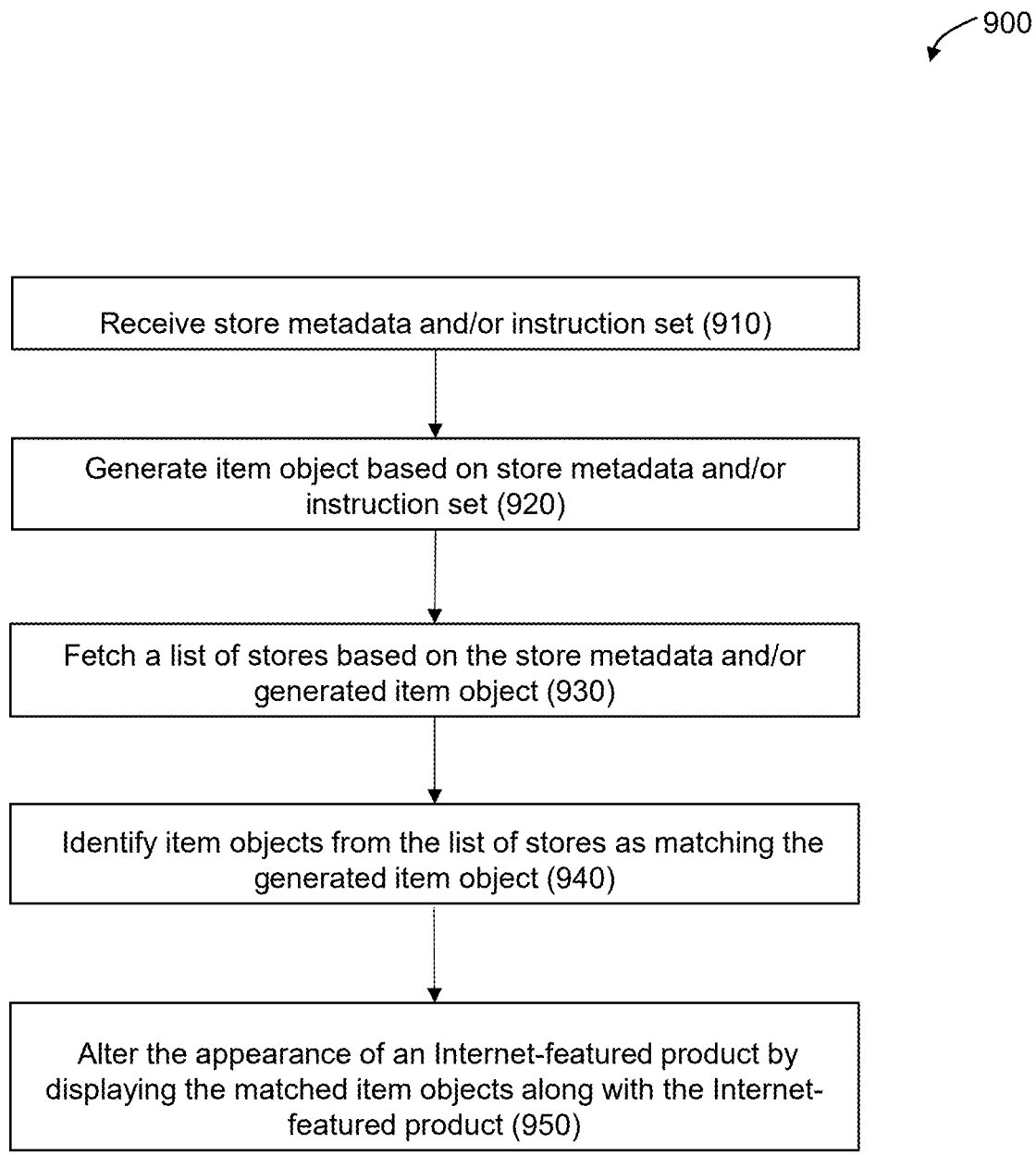
FIG. 9 illustrates graphical representations of an example user interface containing interactive data units provided on client nodes to provide price comparisons, according to one exemplary embodiment.
Figure 10:
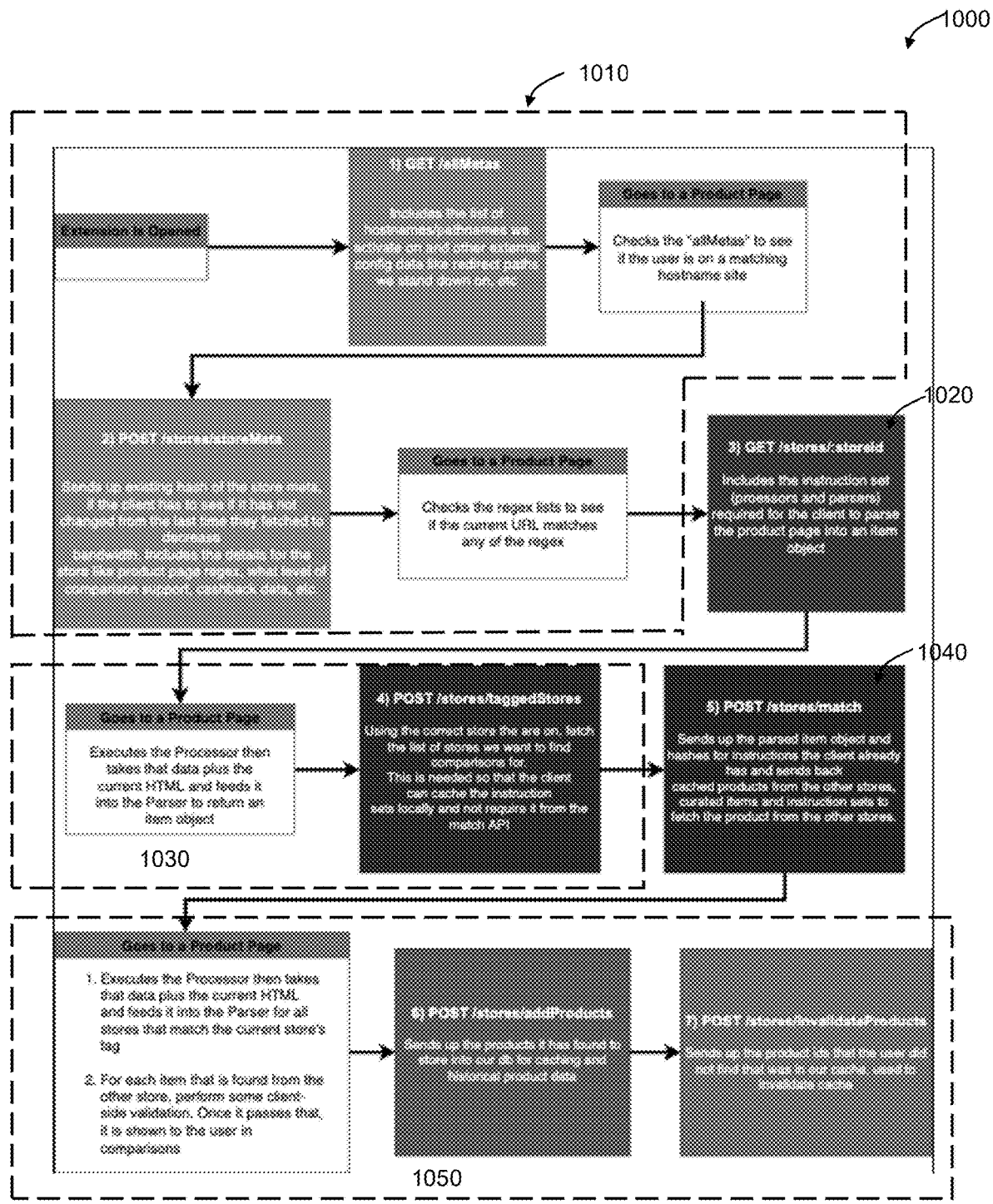
FIG. 10 illustrates graphical representations of an example user interface containing interactive data units provided on client nodes to provide price comparisons, according to one exemplary embodiment.

FIG. 9 is a flow diagram depicting an example process 900 for altering an appearance of an Internet-featured item to provide price comparisons, according to one exemplary embodiment. As depicted in FIG. 10, once the platforms and systems of the present disclosure is initialized, the process 900 begins with operation 910, wherein the system 100 receives store metadata and/or instruction set. In one example, the consumer client node 102 may be a desktop or laptop computer system, and the Internet-featured items (e.g., products) and the interactive data units (e.g., offers, price comparison, etc.) are presented via a web browser window of the client node 102. The web browser of the client node 102 may feature a browser extension 104, wherein the browser extension 104 may be compatible with any web browsers. When a user starts to enter a webpage of an online store, the web browser window of the client node 102 provides a user access to the Internet-featured items (e.g., products) and the interactive data units, as well as facilitates user interactions with the Internet-featured items and the interactive data units. In some embodiments, a browser extension to the web browser may be utilized to display various forms and/or related information of the interactive data units. In some embodiments, the consumer client node 106 may be a mobile device, and the Internet-featured items (e.g., products) and interactive data units (e.g., offers, price comparisons) are presented via a mobile device application 108 of the client node 106. The mobile device application of the client node 106 provides a user access to the Internet-featured items and the interactive data units, as well as facilitates user interactions with the Internet-featured items and the interactive data units. In some embodiments, a mobile device application may be utilized to display various forms and/or related information of the interactive data units.

In operation 910, the browser extension 104 or mobile device application 108 may scrape an online store's website in real-time (or near real-time) to identify store metadata, and send that store metadata to the server platform (e.g., server platform 120). In some embodiments, the store metadata may comprise, but not limit to, a list of hostnames/pathnames the browser extension 104 or mobile device application 108 is operating on, configuration data such as redirect paths downstream, and the like. In some embodiments, the interactive data unit matching engine 124 may utilize one or more matching algorithms to match with the store metadata with a list of hostname site. The data storage 150 of the server platform 120 may store a list of hostname site associated with a number of websites, indicating that these websites are of interest in terms of providing a price comparison function. For example, for online stores (retailer's online stores) selling products that may be also listed on other stores, a price comparison function is desirable, and thus these stores should be added to the list of hostname site. If the store metadata matches with one of the list of hostname site, the system may proceed to determine whether there is change by comparing the received store metadata with the cached store metadata from the last time the user accessed this store website, based on a hash of the store metadata at the two time points. This may reduce the bandwidth required to fetch details of the store-like product page regular expression (Regex), levels of comparison support, rewards/offers/cashback information etc. In some embodiments, the system 100 bypasses the store metadata matching process, and perform product price comparison for any online store the user is viewing, either on or not on the hostname list.

Alternatively or additionally, in operation 910, the system 100 may scrape a retailer's website in real-time (or near real-time) to retrieve instruction set and send to the server platform (e.g., server platform 120) to parse into an item object. In some embodiments, the instruction set may include processors, parsers, and the like.

Next, the process 900 proceeds to operation 920, wherein the system 100 generate item object based on the received store metadata and/or instruction set. In some embodiments, the system 100 may retrieve HyperText Markup Language (HTML) and generate item object via the instruction set (e.g., processors and parsers).

Next, the process 900 continues to operation 930, wherein the system 100 fetches a list of stores based on the store metadata and/or the generated item object. In some embodiments, based on the type of store identified by the store metadata, the system 100 may fetch the list of stores. For example, if the store metadata indicates it is a sports good store, the list of stores that should be fetched is other sports good stores. In another example, if the store metadata indicates it is a department store, the list of stores that should be fetched is other department stores, and potentially similar retailers stores, online-only stores that may sell similar goods. In some embodiments, based on the type of Internet-featured product a user is viewing, the system 100 may fetch a list of stores. For example, if the user is viewing kitchenware, then the list of stores that should be fetched is the stores that may sell kitchenware.

Next, the process 900 may proceed to operation 940, wherein the system 100 may identify item objects from the list of sores as matching the generated item object. In operation 940, the system 100 may send parsed item object associated with the generated item object and hashes for instruction sets of the item object to the server platform 120, and receive the matched item objects from other stores. For example, if a user is viewing Brand A cooking pans on Store P, the system may parse the Internet-featured Item Brand A cooking pans and identify the same product that is being offered to sell by other stores. In some embodiments, additionally information associated with this Internet-featured Item from other stores will also be fetched, such as prices. Next, the process 900 proceeds to operation 950, wherein the system 100 alters the appearance an Internet-featured product by displaying the matched item objects along with the Internet-featured product. In some embodiments, the system may insert a color tag on, near, or overlap with the product image to indicate there is/are other merchants selling the same product. In some embodiments, the tag is inserted to the webpage, indicating the amount would be saved if the user chooses to buy the product from another merchant. In some embodiments, the tag indicating a price comparison may also show an identifier associated the merchant offering a lower price on the same product. The identifier comprises, not limited to, a logo, a trademark, a stamp, a label, and the like. In some embodiments, the product information, the price comparison, and other information such as, item name (e.g., product name), item unique identification number (e.g., product Universal Product Code (UPC)), item barcode, item price, item size, item weight, image URL, product URL, etc. is sent to data storage 150 of the server platform 120. In some embodiments, if a product does not match with any existing item unique identification number (e.g., UPC), the product ID may be sent to data storage 150 of the server platform 120 and invalidate a cache item associated with this product ID.

FIG. 10 is FIG. 10 is a flow diagram depicting an example process 1000 for altering an appearance of an Internet-featured item to provide price comparisons, according to one exemplary embodiment. As depicted in FIG. 10, once the platforms and systems of the present disclosure is initialized, the process 1000 begins with operation 1010, wherein the system 100 receives store metadata and/or instruction set. In one example, the consumer client node 102 may be a desktop or laptop computer system, and the Internet-featured items (e.g., products) and the interactive data units (e.g., offers, price comparison, etc.) are presented via a web browser window of the client node 102. The web browser of the client node 102 may feature a browser extension 104, wherein the browser extension 104 may be compatible with any web browsers. When a user starts to enter a webpage of an online store, the web browser window of the client node 102 provides a user access to the Internet-featured items (e.g., products) and the interactive data units, as well as facilitates user interactions with the Internet-featured items and the interactive data units. In some embodiments, a browser extension to the web browser may be utilized to display various forms and/or related information of the interactive data units. In some embodiments, the consumer client node 106 may be a mobile device, and the Internet-featured items (e.g., products) and interactive data units (e.g., offers, price comparisons) are presented via a mobile device application 108 of the client node 106. The mobile device application of the client node 106 provides a user access to the Internet-featured items and the interactive data units, as well as facilitates user interactions with the Internet-featured items and the interactive data units. In some embodiments, a mobile device application may be utilized to display various forms and/or related information of the interactive data units.

In operation 1010, the browser extension 104 or mobile device application 108 may scrape an online store's website in real-time (or near real-time) to identify store metadata, and send that store metadata to the server platform (e.g., server platform 120). In some embodiments, the store metadata may comprise, but not limit to, a list of hostnames/pathnames the browser extension 104 or mobile device application 108 is operating on, configuration data such as redirect paths downstream, and the like. In some embodiments, the interactive data unit matching engine 124 may utilize one or more matching algorithms to match with the store metadata with a list of hostname site. The data storage 150 of the server platform 120 may store a list of hostname site associated with a number of websites, indicating that these websites are of interest in terms of providing a price comparison function. For example, for online stores (retailer's online stores) selling products that may be also listed on other stores, a price comparison function is desirable, and thus these stores should be added to the list of hostname site. If the store metadata matches with one of the list of hostname site, the system may proceed to determine whether there is change by comparing the received store metadata with the cached store metadata from the last time the user accessed this store website, based on a hash of the store metadata at the two time points. This may reduce the bandwidth required to fetch details of the store-like product page regular expression (Regex), levels of comparison support, rewards/offers/cashback information etc. In some embodiments, the system 100 bypasses the store metadata matching process, and perform product price comparison for any online store the user is viewing, either on or not on the hostname list.

Alternatively or additionally, in operation 1010, the system 100 may scrape a retailer's website in real-time (or near real-time) to retrieve instruction set and send to the server platform (e.g., server platform 120) to parse into an item object. In some embodiments, the instruction set may include processors, parsers, and the like. A parser may be a hardware, firmware, or software component that takes input data (frequently text) and builds a data structure. In some embodiments, the parser may be utilized to parse a product page (e.g., a webpage containing products' information and presentation) to generate item objects.

Next, the process 1000 proceeds to operation 1020, wherein the system 100 generate item object based on the received store metadata and/or instruction set. In some embodiments, the system 100 may retrieve HyperText Markup Language (HTML) and generate item object via the instruction set (e.g., processors and parsers).

Next, the process 1000 continues to operation 1030, wherein the system 100 fetches a list of stores based on the store metadata and/or the generated item object. In some embodiments, based on the type of store identified by the store metadata, the system 100 may fetch the list of stores. For example, if the store metadata indicates it is a sports good store, the list of stores that should be fetched is other sports good stores. In another example, if the store metadata indicates it is a department store, the list of stores that should be fetched is other department stores, and potentially similar retailers stores, online-only stores that may sell similar goods. In some embodiments, based on the type of Internet-featured product a user is viewing, the system 100 may fetch a list of stores. For example, if the user is viewing kitchenware, then the list of stores that should be fetched is the stores that may sell kitchenware.

Next, the process 1000 may proceed to operation 1040, wherein the system 100 may identify item objects from the list of sores as matching the generated item object. In operation 1040, the system 100 may send parsed item object associated with the generated item object and hashes for instruction sets of the item object to the server platform 120, and receive the matched item objects from other stores. For example, if a user is viewing Brand A cooking pans on Store P, the system may parse the Internet-featured Item Brand A cooking pans and identify the same product that is being offered to sell by other stores. In some embodiments, additionally information associated with this Internet-featured Item from other stores will also be fetched, such as prices.

Figure 11:
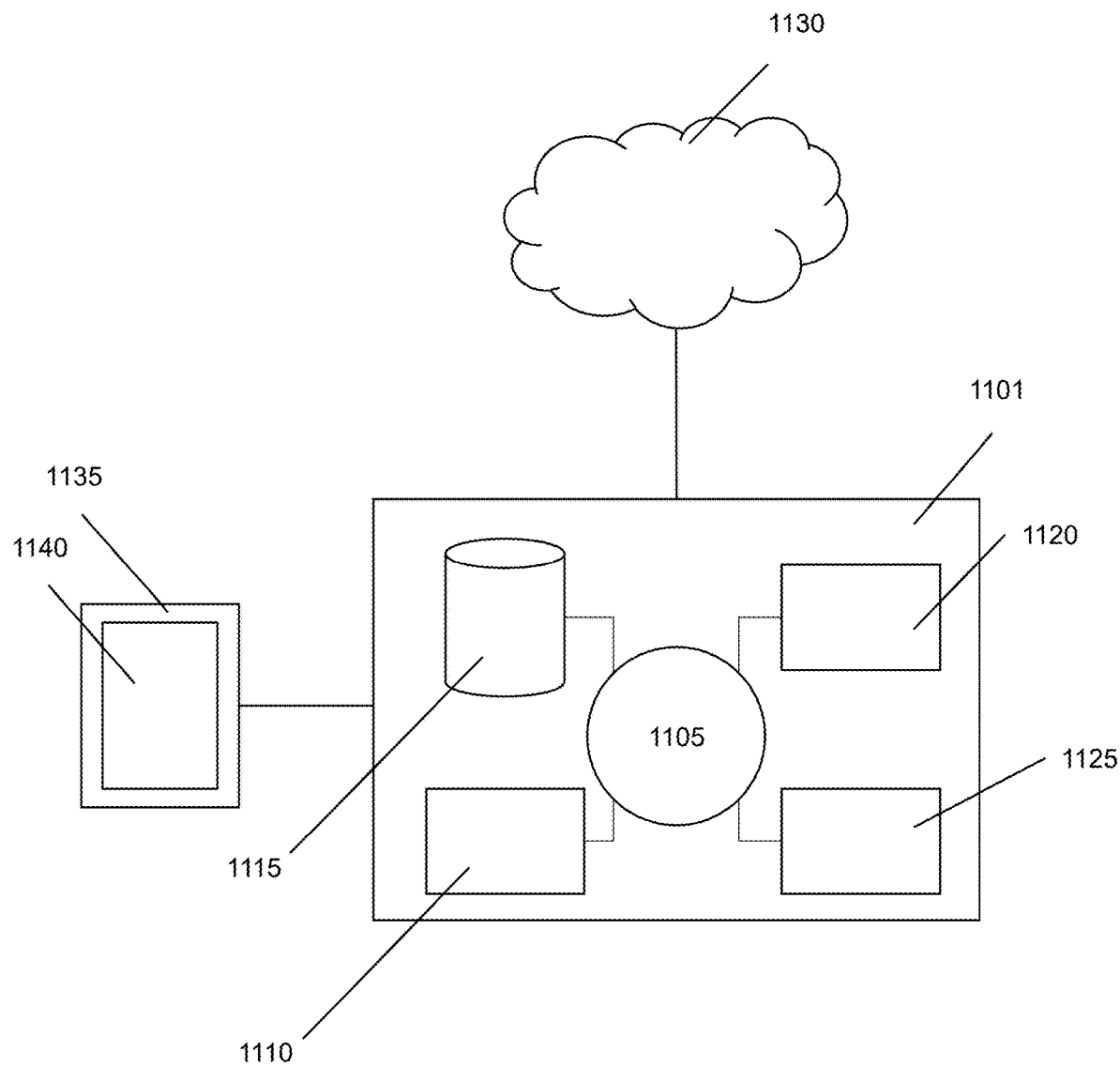
FIG. 11 shows a computer system that is programmed or otherwise configured to implement methods provided herein.

Next, the process 1000 proceeds to operation 1050, wherein the system 100 alters the appearance an Internet-featured product by displaying the matched item objects along with the Internet-featured product. In some embodiments, the system may insert a color tag on, near, or overlap with the product image to indicate there is/are other merchants selling the same product. In some embodiments, the tag is inserted to the webpage, indicating the amount would be saved if the user chooses to buy the product from another merchant. In some embodiments, the tag indicating a price comparison may also show an identifier associated the merchant offering a lower price on the same product. The identifier comprises, not limited to, a logo, a trademark, a stamp, a label, and the like. In some embodiments, the product information, the price comparison, and other information such as, item name (e.g., product name), item unique identification number (e.g., product Universal Product Code (UPC)), item barcode, item price, item size, item weight, image URL, product URL, etc. is sent to data storage 150 of the server platform 120. In some embodiments, if a product does not match with any existing item unique identification number (e.g., UPC), the product ID may be sent to data storage 150 of the server platform 120 and invalidate a cache item associated with this product ID Computer Systems The present disclosure provides computer systems that are programmed to implement methods of the disclosure. FIG. 11 shows a computer system 1101 that is programmed or otherwise configured to altering an appearance of the interactive data units. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an Internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI). Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for scraping a third-party webpage to identify one or more items that match a delineated list of items, visually highlighting the one or more items to provide real-time graphically distinct items thereby enhancing a user's experience in an e-commerce environment, the method comprising:
   (a) scraping, using a browser extension, the third-party webpage to retrieve item data associated with an item of a plurality of items from the third-party web page, the item data comprising an item description, an item name, or an item identification number, and verifying an image URL from the scraping is associated with the item identified by the item name or the item identification number;
   (b) identifying, using the browser extension, a match between the item from the plurality of items and one or more of a plurality of interactive data units by using one or more matching algorithms, wherein the one or more of the interactive data units comprise an offer or a reward associated with purchasing the item from the plurality of items, and generating a code indicative of the match;
   (c) upon generating the code indicative of the match, generating, using the browser extension, a set of code for displaying additional information associated to the offer or the reward for purchasing the item from the plurality of items, to an existing appearance of the item description associated with the item from the plurality of items to generate a modified item description; and
   (d) injecting and executing the set of code for displaying the modified item description within the third-party web page to graphically and visually distinguish the item from the plurality of items as matched with the one or more of the plurality of interactive data units.

2. The method of claim 1, wherein (a)-(d) are performed by the browser extension in real-time.

3. The method of claim 1, further comprising, prior to (a), receiving, by the browser extension, a user request to access the third-party web page from a client node of a user.

4. The method of claim 1, wherein (c) further comprising: altering the existing appearance of the item description associated with the item by inserting a price comparison across different item providers.

5. The method of claim 1, wherein altering the existing appearance of the item description comprises visually highlighting the item from the plurality of items on the web page.

6. The method of claim 1, wherein altering the existing appearance of the item description comprises displaying an additional graphical element without withholding information of the item description.

7. The method of claim 6, wherein the additional graphical element comprises a symbol, or an outline along a periphery of the item description, or both.

8. The method of claim 1, wherein altering the existing appearance of the item description comprises presenting an activation parameter associated with the matched interactive data unit on the web page, and wherein the matched interactive data unit of the plurality of the interactive data units is activatable at a client node upon satisfaction of the activation parameter by a user of the client node.

9. A non-transitory computer-readable medium comprising machine-executable code that, upon execution by a browser extension, implements a method for scraping a third-party webpage to identify one or more items that match a delineated list of items, visually highlighting the one or more items to provide real-time graphically distinct items thereby enhancing a user's experience in an e-commerce environment, the method comprising:
   (a) scraping, using a browser extension, the third-party webpage to retrieve item data associated with an item of a plurality of items from the third-party web page, the item data comprising an item description, an item name, or an item identification number, and verifying an image URL from the scraping is associated with the item identified by the item name or the item identification number;
   (b) identifying, using the browser extension, a match between the item from the plurality of items and one or more of a plurality of interactive data units by using one or more matching algorithms, wherein the one or more of the interactive data units comprise an offer or a reward associated with purchasing the item from the plurality of items, and generating a code indicative of the match;
   (c) upon generating the code indicative of the match, generating, using the browser extension, a set of code for displaying additional information associated to the offer or the reward for purchasing the item from the plurality of items, to an existing appearance of the item description associated with the item from the plurality of items to generate a modified item description; and
   (d) injecting and executing the set of code for displaying the modified item description within the third-party web page to graphically and visually distinguish the item from the plurality of items as matched with the one or more of the plurality of interactive data units.

10. The non-transitory computer-readable medium of claim 9, wherein (a)-(d) are performed by the browser extension in real-time.

11. The non-transitory computer-readable medium of claim 9, further comprising, prior to (a), receiving, by the browser extension, a user request to access the third-party web page from a client node of a user.

12. The non-transitory computer-readable medium of claim 9, wherein (c) further comprising: altering the existing appearance of the item description associated with the item by inserting a price comparison across different item providers.

13. The non-transitory computer-readable medium of claim 9, wherein altering the existing appearance of the item description comprises visually highlighting the item from the plurality of items on the web page.

14. The non-transitory computer-readable medium of claim 9, wherein altering the existing appearance of the item description comprises displaying an additional graphical element without withholding information of the item description.

15. The non-transitory computer-readable medium of claim 14, wherein the additional graphical element comprises a symbol, or an outline along a periphery of the item description, or both.

16. The non-transitory computer-readable medium of claim 9, wherein altering the existing appearance of the item description comprises presenting an activation parameter associated with the matched interactive data unit on the web page, and wherein the matched interactive data unit of the plurality of the interactive data units is activatable at a client node upon satisfaction of the activation parameter by a user of the client node.

* * * * *